(12) United States Patent
Diel

(10) Patent No.: US 9,290,184 B1
(45) Date of Patent: Mar. 22, 2016

(54) TIRE FORCE MODELING RIG AND METHOD OF USING SAME

(71) Applicant: David A. Diel, Hastings, MN (US)

(72) Inventor: David A. Diel, Hastings, MN (US)

(73) Assignee: David A. Diel, Golden, CO (US)

( * ) Notice: Subject to any disclaimer, the term of this patent is extended or adjusted under 35 U.S.C. 154(b) by 282 days.

(21) Appl. No.: 13/627,820

(22) Filed: Sep. 26, 2012

Related U.S. Application Data

(60) Provisional application No. 61/539,001, filed on Sep. 26, 2011.

(51) Int. Cl.
*B60W 30/045* (2012.01)
*B60W 40/10* (2012.01)
*B60W 50/00* (2006.01)
*B60C 23/04* (2006.01)

(52) U.S. Cl.
CPC ............ *B60W 40/10* (2013.01); *B60C 23/0474* (2013.01); *B60W 50/0097* (2013.01)

(58) Field of Classification Search
None
See application file for complete search history.

(56) References Cited

U.S. PATENT DOCUMENTS

| 3,830,093 | A | * | 8/1974 | Emerson | G01M 17/04 346/118 |
|---|---|---|---|---|---|
| 3,895,681 | A | | 7/1975 | Griffin et al. | |
| 4,498,243 | A | | 2/1985 | Kashiwagi | |
| 5,054,207 | A | | 10/1991 | Marshall | |
| 5,723,782 | A | * | 3/1998 | Bolles, Jr. | B60G 17/0162 73/146 |
| 2002/0144414 | A1 | * | 10/2002 | Jackson | G01B 5/255 33/203.12 |
| 2003/0230137 | A1 | * | 12/2003 | Kemp | G01M 17/007 73/116.01 |
| 2005/0139409 | A1 | | 6/2005 | Bogue | |
| 2007/0118258 | A1 | * | 5/2007 | Probst | G01M 17/04 701/31.4 |
| 2007/0260372 | A1 | * | 11/2007 | Langer | G01M 17/04 701/31.4 |
| 2008/0183449 | A1 | | 7/2008 | Grichnik et al. | |
| 2014/0190753 | A1 | * | 7/2014 | Mian | G01G 19/047 177/1 |

* cited by examiner

*Primary Examiner* — John R Olszewski
*Assistant Examiner* — Jess Whittington

(57) ABSTRACT

A tire force modeling rig and method of obtaining data for use in optimizing cornering performance in a four-wheeled racing vehicle includes first measuring unsprung weight at each wheel. The vehicle is then positioned on the tire force modeling rig. The rig includes a first set of floating scales for recording the weight at each tire on a first side of the racing vehicle, a second set of fixed position scales for recording the weight at each tire on an opposing second side of the racing vehicle, and a mechanism to effect a horizontal force onto the racing vehicle. Scale readings at each wheel are recorded, after which a first horizontal force is applied to the vehicle. With the horizontal force applied, updated scale readings at each wheel are recorded. Collected data can then be used to ascertain optimal car setup.

9 Claims, 17 Drawing Sheets

FIGURE 10

 = Input Value

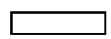 = Calculated Value

Note: All dimensions are in inches
All forces are in Lbs
Spring Rates and Sway Bar rates are in Lb/in CG Location is measured from centerline right side tires and front axle

SETUP

SWAY BAR 578

| LF | 175 | | 200 | RF |
| LR | 160 | | 325 | RR |

PANHARD BAR
| 13.375 | | 12.69 |

| | | | | |
|---|---|---|---|---|
| WHEELBASE | 104 | | | |
| C.G. HEIGHT | 14.09 | | | |
| P.H. BAR LENGTH | 36 | ROLL CENTER REAR | 13.03 |
| REAR TRACK WIDTH | 64.625 | SPRUNG CG HEIGHT | 14.21 |
| LR WHEEL TO P.H. BAR AXLE MT | 16.438 | CG LOCATION FROM RT SIDE | 37.08 |
| PH BAR DIST FM FRT AXLE | 94 | CG LOCATION BEH. FRT AXLE | 51.18 |
| REAR AXLE HEIGHT | 13.50 | | |

UNSPRUNG WEIGHT   Input the scale readings from individual wheel unsprung weight measurements

UNSPRUNG WEIGHT SCALE READINGS

| LF | 76 | | 89 | RF | FRONT AXLE WEIGHT | 165 |
| | | | | | REAR AXLE WEIGHT | 310 |
| LR | 162 | | 148 | RR | SPRUNG WEIGHT | 2244 |

SCALE READINGS WITH NO EXTERNAL FORCES

SCALE READINGS

| LF | 736 | | 645 | RF |
| LR | 824 | | 514 | RR |

| -0.6 | CASTER WEDGE REDUCTION (%) |

WEDGE ADJUSTED SCALE READINGS
| 712 | | 669 |
| 848 | | 490 |

| 54.0 | BASE WEDGE (%) |
| 53.4 | BASE +CASTER REDUCTION (%) |
| 2.4 | WEDGE ADJUSTMENT (%) |
| 55.8 | FINAL WEDGE USED FOR CALCS (%) |
| 57.4 | LEFT (%) |
| 49.2 | REAR (%) |
| 2719 | TOTAL |

PUSH UP ON PANHARD BAR MOUNT   Place jack directly under the panhard bar frame side heim and push up about 3/8 to 1/2"

| | SCALE READINGS | | | | RR VERT PUSH - NEF | | | | WITH REAR AXLE REACTION | | |
|---|---|---|---|---|---|---|---|---|---|---|---|
| LF | 780 | 566 | RF | LF | 44 | -79 | RF | LF | 44 | -79 | RF |
| LR | 703 | 323 | RR | LR | -121 | -191 | RR | LR | 138 | -103 | RR |

Total Push Up Force  -347        Axle Reaction L  259    88  Axle Reaction R

| | NORMALIZED | | |
|---|---|---|---|
| LF | 0.1268 | -0.2277 | RF |
| LR | 0.3969 | -0.2961 | RR |

PUSH UP AT SPRUNG CG

Push Point Location:    From right side  38.1    Behind front axle  47.6

| | SCALE READINGS WITH PUSH UP | | | | NEF - PUSH UP | | | | FACTORED (NEF-PUSH UP) + UNSPRUNG | | |
|---|---|---|---|---|---|---|---|---|---|---|---|
| LF | 608 | 572 | RF | LF | 128 | 73 | RF | LF | 854 | 533 | RF |
| LR | 732 | 438 | RR | LR | 92 | 76 | RR | LR | 721 | 610 | RR |

Total Push Up Force  369

LOW HORIZ. PULL    Pull at roll center height (chassis will not roll when pull force is at roll center height)

Approx. RCH@ CG  6.41

| | SCALE READINGS (lbs) | | | | | | | LOW PULL - NEF | | |
|---|---|---|---|---|---|---|---|---|---|---|
| LF | 732 | 650 | RF | LF Pull Force | 73 | | | LF | -4 | 5 | RF |
| LR | 781 | 559 | RR | Cylinder Bore (in) | 1.75 | | | LR | -43 | 45 | RR |

PULL HEIGHT  5.6        Rod Size (in)  0

PULL FORCE  497.0       Required Air Pressure  30.3

Panhard Bar Horizontal Force (During Pull)  271

HIGH HORIZ. PULL    Pull force must be the same as low pull

| | SCALE READINGS | | | | HIGH PULL - LOW PULL | | | | NORMALIZED | | |
|---|---|---|---|---|---|---|---|---|---|---|---|
| LF | 514 | 870 | RF | LF | -218 | 220 | RF | LF | -0.0123 | 0.012414 | RF |
| LR | 714 | 624 | RR | LR | -67 | 65 | RR | LR | -0.00378 | 0.003668 | RR |

PULL HEIGHT  41.187

PULL FORCE  498.0

TIRE FORCE MODELING RIG AND METHOD OF USING SAME

CROSS-REFERENCE TO RELATED APPLICATION

This application claims the benefit of U.S. Provisional Patent Application No. 61/539,001, filed 26 Sep. 2011, which is hereby incorporated herein by reference.

BACKGROUND OF INVENTION

The present invention relates to high performance racing vehicles. More particularly, the present invention relates to an apparatus and method for modeling forces on the tires of a racing vehicle at various combinations of horizontal and vertical g-forces that can be expected on any given racetrack.

The adjustment of racing vehicle suspension components (collectively known as the "setup") is critical to optimize cornering performance of the racing vehicle. Essentially, the set up of the vehicle is designed to achieve optimal weight balance between the individual tires to maximize performance of the car based upon differing track types or conditions. For example, the car setup may vary from track to track without making major changes to the car itself. Such changes are necessary to compensate for track pitch, turn radius, friction characteristics of the racing surface, as well as other conditions. Each track yields different g-forces for a given type of race car. Considerations that are taken into account when setting up a race car include, but are not limited to, individual wheel spring rates, sway bar rate, track bar or panhard bar location, upper and lower control arm locations and angles, trailing arm locations and angles, third link locations and angles, front and rear roll centers of the vehicle, weight and weight balance of the vehicle, suspension motion ratios, chassis stiffness, gas loaded shock absorber forces, bump stops or coil binds and aerodynamic characteristics of the car. Variations and changes of each of the aforementioned may have an affect on how the car handles during operation.

Typically, changes made in setup have to be tested on the specific track to determine the results and affects of the change. This can be quite time consuming and costly. There is further room for error on such type of testing as the driver may not follow the exact same path along the track and through the corners after each modification has been made. Also, the tire and track friction characteristics are constantly changing and the driver inputs to the vehicle vary from lap to lap. There therefore exists a need for a method and apparatus to quickly test, under controlled conditions, various setup combinations. There also exists a need for a method and apparatus to quantify the change in tire forces resulting from changing single or multiple setup parameters without having to run the racing vehicle on the track after each change.

BRIEF SUMMARY OF INVENTION

The present invention includes a tire force modeling rig, and method of using the same, for simulating cornering forces on a racing vehicle to optimize performance of the racing vehicle for a specific racing track. Data specific to a racing track is first obtained through use of horizontal and vertical accelerometers. Initial vehicle data is then collected, including data relative to the vehicle's unsprung weight, wheelbase, panhard bar, sway bar and the weight at each wheel. The vehicle is placed on the tire force modeling rig comprising individual scales for supporting each tire. Scales for the left tires are free floating while the scales for the right tires connect to a bracket attached to the floor. A system of pulls are effected onto the vehicle at strategic points and the change of the weight at each wheel is recorded. All data is inputted into a computer program which, through a system of equations, models tire forces for each tire. The user can then manipulate car settings within the computer program to observe how such changes will affect tire forces on the vehicle in order to optimize setup parameters for the vehicle for that track.

BRIEF DESCRIPTION OF DRAWINGS

FIG. 10 is a display of input setup values and calculations of an exemplary racing vehicle in accordance with the present invention.

FIG. 11 is a display of input values and calculations after performing steps on the exemplary racing vehicle utilizing the push-up, 2-pull method in accordance with the present invention.

FIG. 13 contains a series of tables associated with output values of the exemplary racing vehicle with the panhard bar split held constant and the cross weight (wedge) reduced by 0.8% from FIG. 12.

FIG. 14 contains a series of tables associated with output values of the exemplary racing vehicle with the left side panhard bar height held constant.

FIG. 15 contains a series of tables associated with output values of the exemplary racing vehicle with the left side panhard bar height held constant and the cross weight (wedge) reduced by 0.8% from FIG. 14.

FIG. 16 contains a series of tables associated with output values of the exemplary racing vehicle with the left side panhard bar height held constant and the left side panhard bar height reduced by 0.775 inches from FIG. 14.

FIG. 17 contains a series of tables associated with output values of the exemplary racing vehicle with the left side panhard bar height held constant and the left side panhard bar height increased by 2.15 inches from FIG. 16.

FIG. 18 contains a series of tables associated with output values of the exemplary racing vehicle with the left side panhard bar height held constant and the left side panhard bar height reduced by 0.875 inches from FIG. 14.

FIG. 19 contains a series of tables associated with output values of the exemplary racing vehicle with the left side panhard bar height held constant and the left side panhard bar height increased by 1.375 inches from FIG. 14.

DESCRIPTION OF INVENTION

Figure 1:
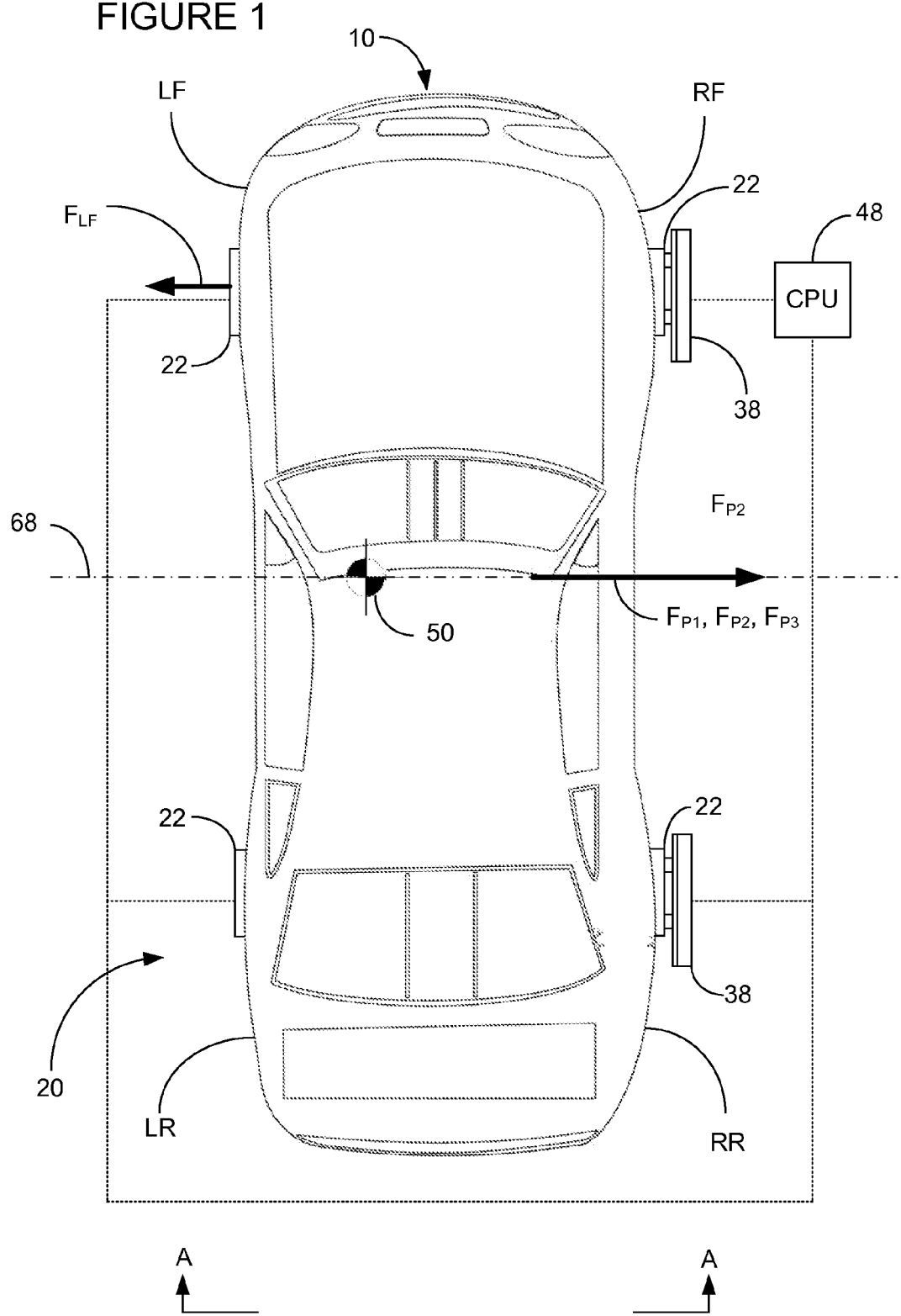
FIG. 1 is a top view of racing vehicle with a tire force modeling rig of the present invention being applied thereto.
Figure 2:
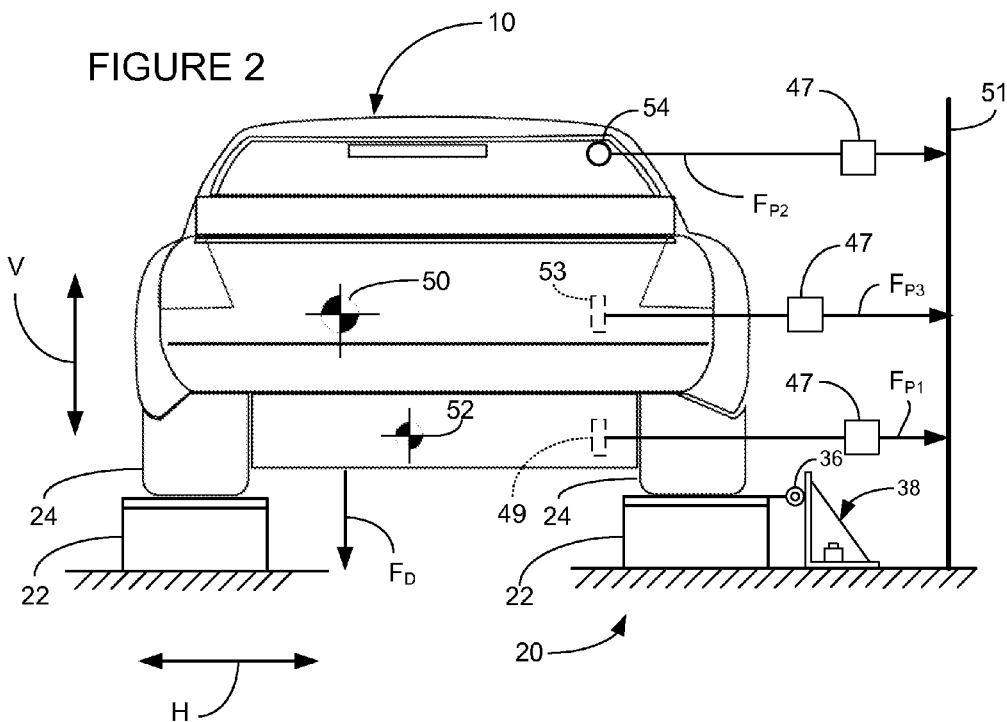
FIG. 2 is a rear view of the racing vehicle as taken along lines A-A in FIG. 1 with the tire force modeling rig of the present invention being applied thereto.
Figure 3:
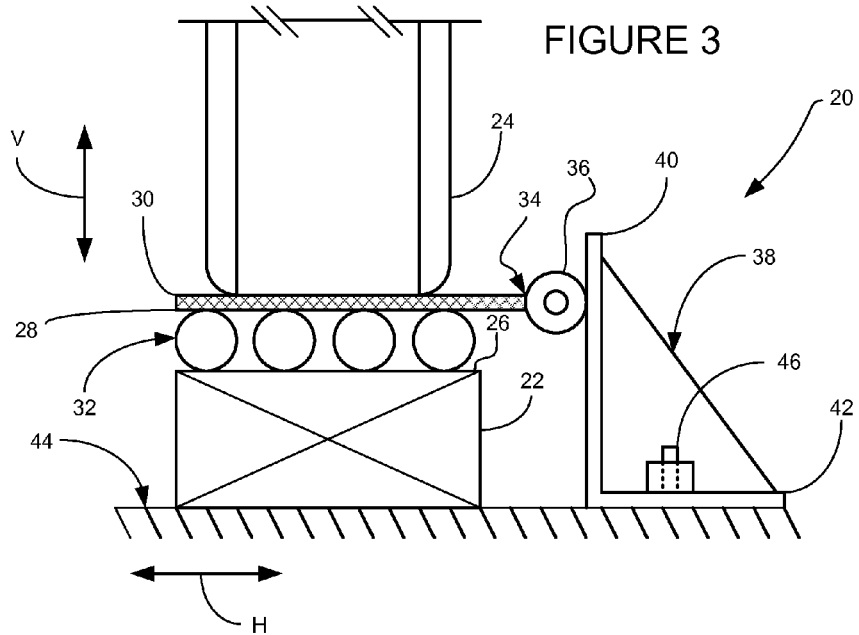
FIG. 3 is an enlarged portion FIG. 2 of a right-side tire of the racing vehicle positioned on components of the tire force modeling rig of the present invention.

A tire force modeling rig of the present invention for acquiring and modeling tire forces on a static racing car 10 is generally indicated at 20 in FIGS. 1 through 3. For purposes of this description, the driver's side of the vehicle will be referred to the left side, with the opposing side being referred to as the right side. Further, portions of the car 10 will be referred to as the Left Front ("LF"), the Right Front ("RF"), Left Rear ("LR") and Right Rear ("RR") as illustrated in FIG. 1.

Figure 4:
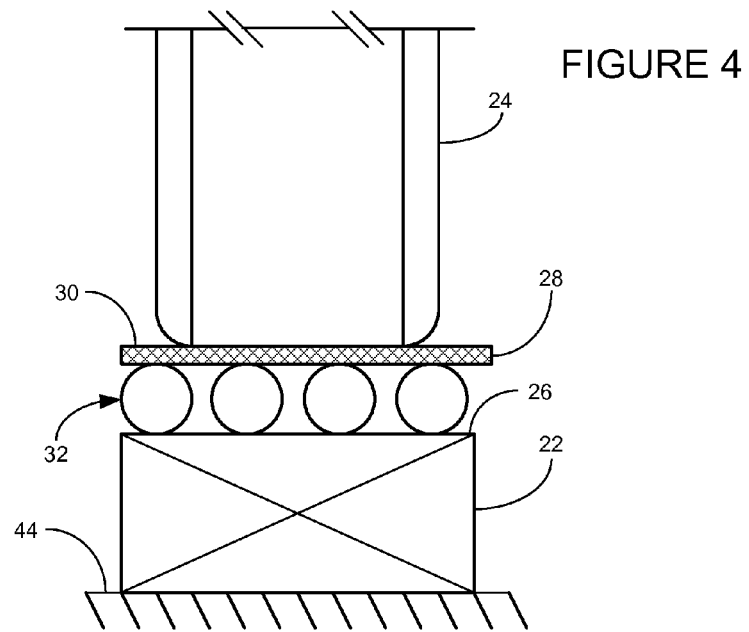
FIG. 4 is an enlarged view from FIG. 2 of the left-rear tire of the racing vehicle positioned on components of the tire force modeling rig of the present invention.

The rig 20 generally comprises four sets of scales 22. Each scale set 22 is positioned to support a tire 24 of the racing car 10. Each scale set 22 may include a single or plurality of scales to measure loads at different points of each tire, for example at an outer, center and inner portion of each tire 24. As illustrated in FIGS. 3 and 4, each tire 24 rests upon a platform 28 having an abrasive surface 30 to provide a friction contact between each tire 24 and the platform 28. Each platform 28 is supported by a roller assembly 32 engaged to the top surface 26 of the scale 22. The roller assembly 32 permits translational movement of the platform along the horizontal axis H. Referring to FIG. 3, each scale set 22 positioned at the RF and RR tires 24 includes a distal end 34 of the platform 28 connected to a roller bearing 36 slidably engaged to a substantially vertical leg 40 of an "L"-shaped bracket 38. The roller bearing 36 permits translational movement of the platform 28 on the right side of the vehicle 10 along the vertical axis V. An opposing leg 42 of the bracket 38 is fixedly attached to the floor 44 by, for example, a bolt 46 and is thus prevented from moving. It should be noted, though, that in place of bracket 38, any suitable rigid surface capable of withstanding forces of the vehicle is well within the scope of the present invention.

Figure 5:
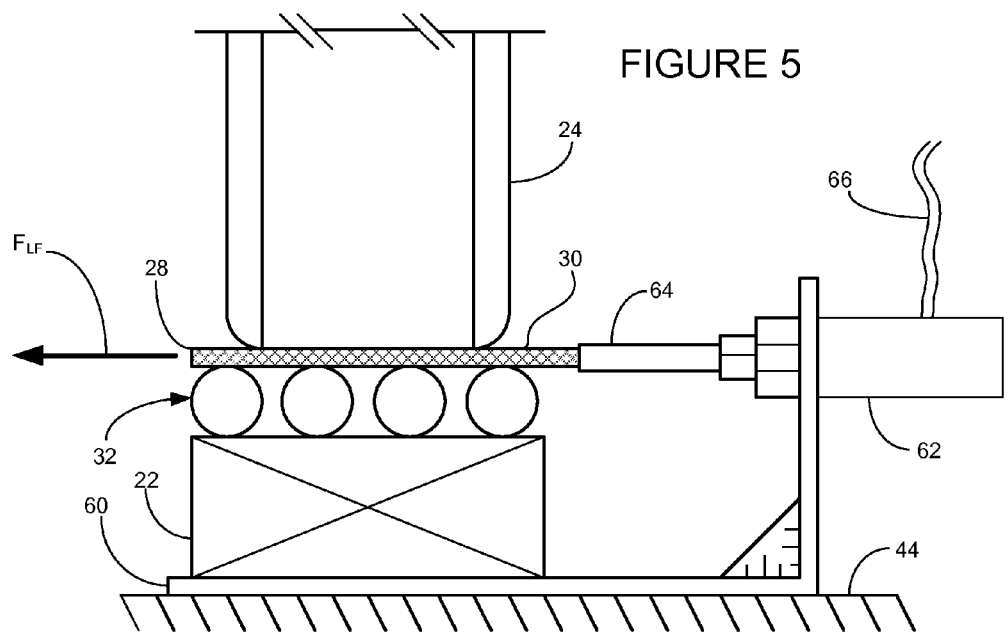
FIG. 5 is front view of the right-front tire taken along lines B-B with the racing vehicle positioned on components of the tire force modeling rig of the present invention.

Referring to FIG. 5, the scale set 22 positioned at the LF tire includes an "L" shaped bracket 60 upon which the scale pad 22 is supported. A pneumatic cylinder 62 is fixedly attached to the vertical leg of the bracket 60. Compressed air is selectively supplied to the pneumatic cylinder 62 through a flexible hose 66. The piston rod 64 of the pneumatic cylinder 62 engages the platform 28 directly under the center of the tire to exert a force on the tire in a horizontal direction H.

Each of the scale sets 22 connect to a central processing unit ("CPU") 48 which acquires and records data received therefrom. Alternatively, a user can manually input data from each scale set 22 into the CPU 48. The CPU 48 is programmed to accurately model the vertical force on each tire 22 at various combinations of horizontal and vertical g-forces that can be expected on any given track. By evaluating the difference in front to rear tire force on each side of the car, the user can predict if the car will exhibit understeer, neutral steer or oversteer characteristics, as is known in the art, at any point while cornering. The rig 20 and method of the present invention allows the user to evaluate the change in tire forces resulting from a change in a single or multiple setup parameters. The advantages of employing the present invention include, but are not limited to, being able to observe various setup combinations quickly and efficiently in the shop under controlled conditions which eliminates inherent track testing variables, being able to quantify change in tire forces resulting from changes in multiple setup parameters, driver preferences regarding handling can be accounted for, and handling of the car can be evaluated with various combinations of horizontal and vertical g forces as well as aerodynamic forces.

As each track yields different g-forces for a given type of car, initial data acquisition at each track is required to determine the expected vertical and horizontal g-forces exerted on the car through each corner. As is known in the art, this is accomplished through use of horizontal and vertical accelerometers (not shown) placed in the car while running several laps around the track to record the data. This data is inputted into the CPU program. Generally, data from a single test session at a specific track will be sufficient to provide the proper modeling conditions expected at that track. The initial data acquisition should remain valid as long as the track conditions, for example cornering radius and elevation, remain the same.

To test the car 10, initial measurement of the car's static parameters are first obtained. Such parameters include the wheel base, center of gravity height, panhard bar length, rear track width, left rear wheel to pan hard bar axle mount, pan hard bar distance from front axle, and rear axle height, the measurement of which is known to those skilled in the art. The height and location of the vehicle's sprung center of gravity 50 must also be determined from scale readings and calculations. As is also known in the art, the sprung weight is the portion of the vehicle's total mass that is supported above the suspension, typically including the body, frame, the internal components, passengers, and cargo, but not the mass of the components suspended below the suspension components, for example, the wheels, wheel bearings, brake rotors and calipers, which are part of the vehicle's unsprung weight. The sprung center of gravity 50 is the center of gravity for the sprung weight of the car.

After taking initial readings, the car 10 is positioned on the rig 20 of the present invention and external forces are applied to the car to simulate centripetal acceleration forces the car would be subjected to while turning a corner on a specific track. If turnplates are available, the change in cross weight due to caster is determined and recorded by turning the front wheels while the car is supported on scale pads, as is known in the art.

Figure 6:
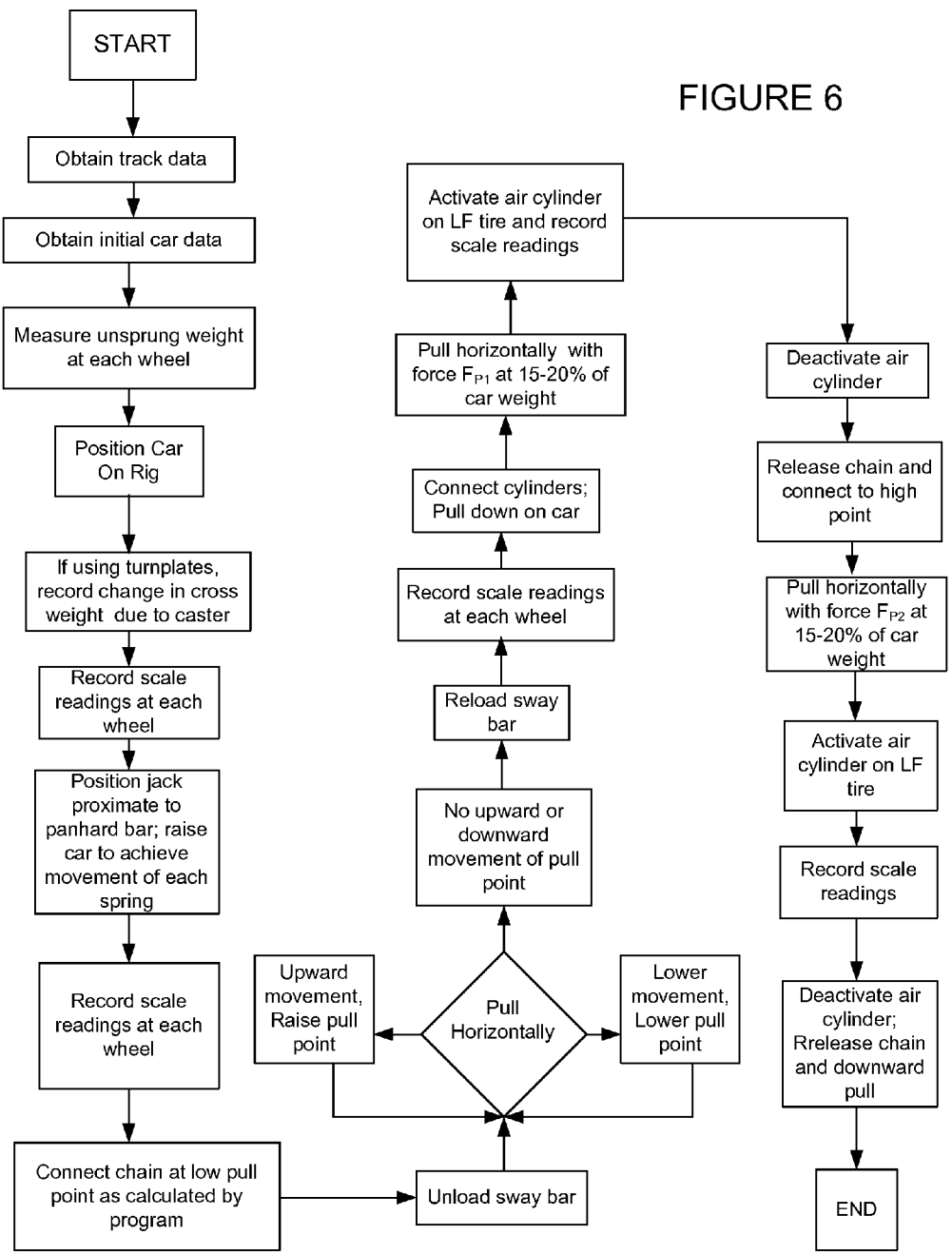
FIG. 6 is a flow chart of a pull-down, 2-pull method in accordance with the present invention.
Figure 7:
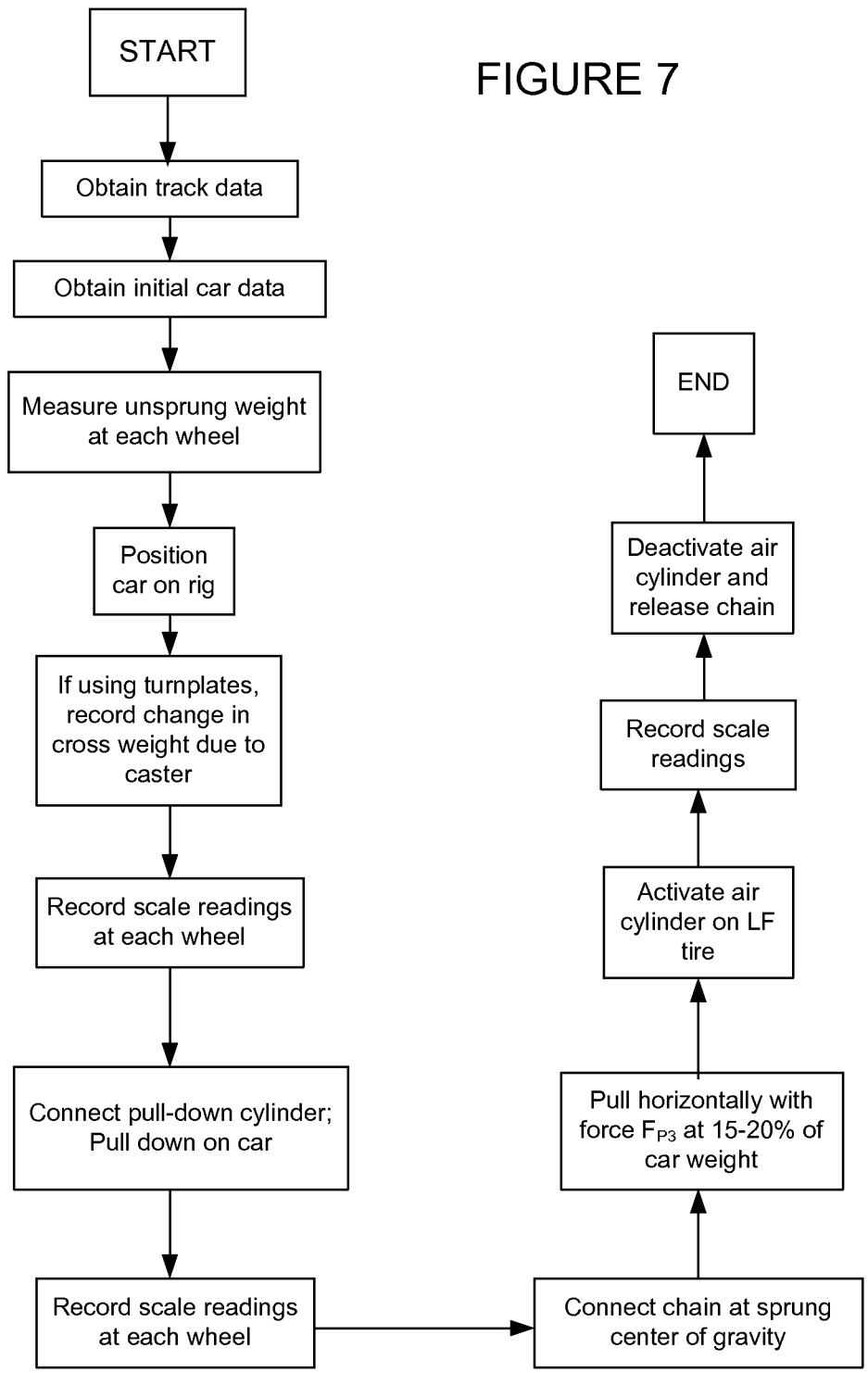
FIG. 7 is a flow chart of a pull-down, 1-pull method in accordance with the present invention.
Figure 8:
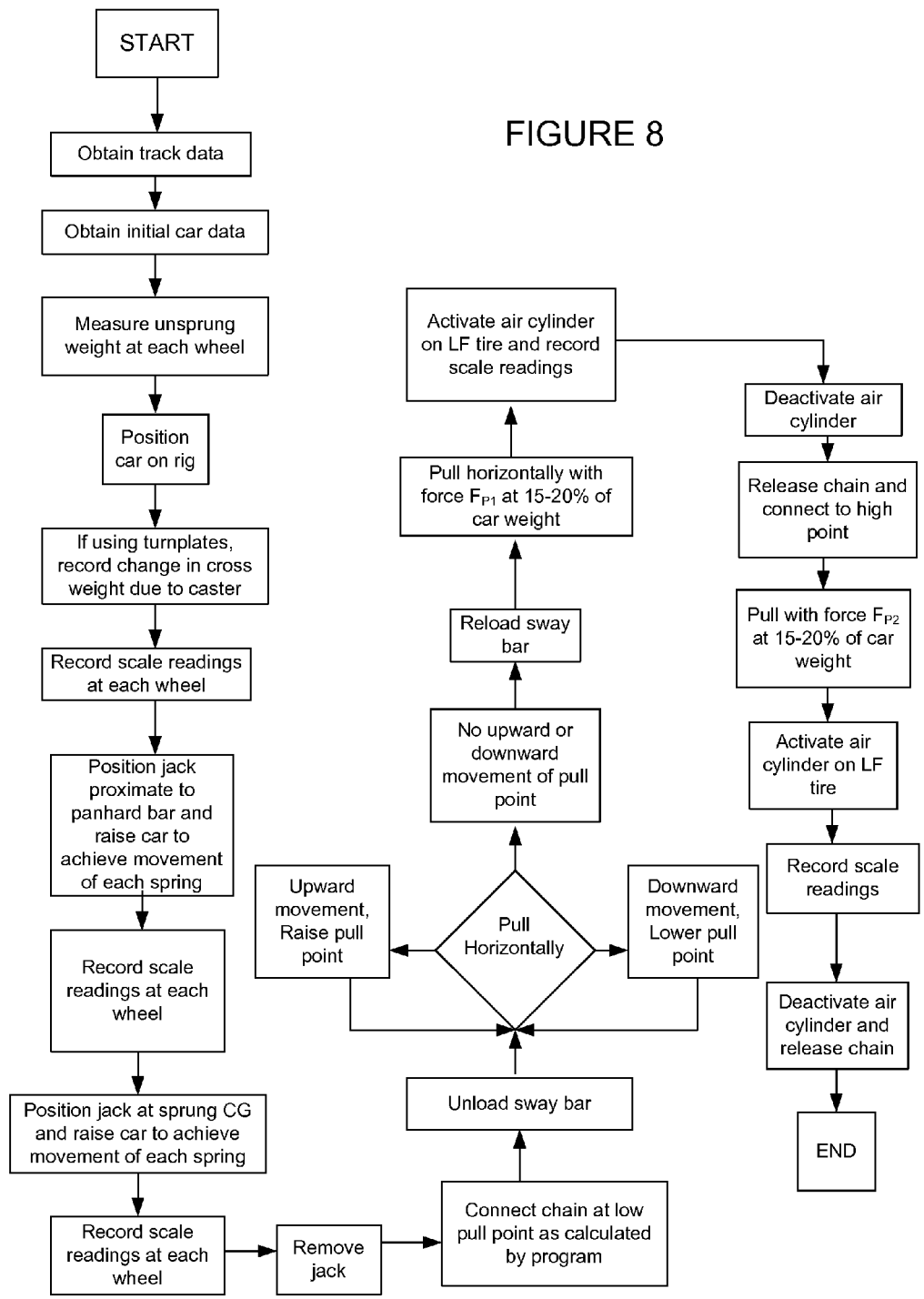
FIG. 8 is a flow chart of a push-up, 2-pull method in accordance with the present invention.
Figure 9:
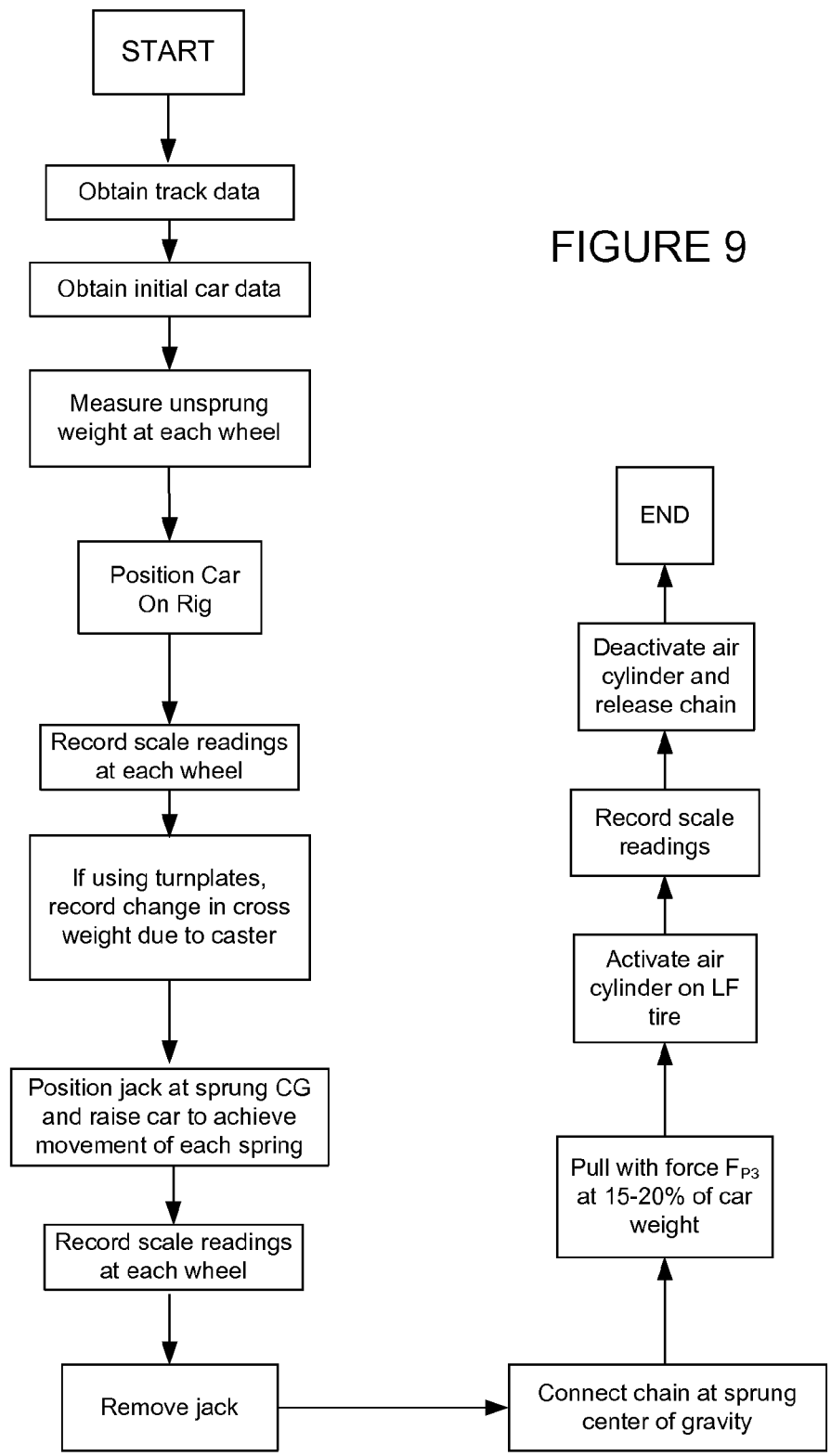
FIG. 9 is a flow chart of push-up, 1-pull method in accordance with the present invention.

Vertical acceleration forces may be simulated by either a pull-down method or a push-up method. FIGS. 6 and 7 are flowcharts for performing variations of the pull-down method. FIGS. 7 and 8 are flowcharts for performing variations of the push-up method. Utilizing the pull-down method of either FIG. 6 or FIG. 7, vertical acceleration forces are simulated by pulling vertically down from the frame proximate the wheel 24 at the LF, RF and RR corners of the car 10 by hydraulic cylinders with a force $F_D$. Force $F_D$ represents the additional vertical force that the sprung mass is subjected to while the car travels through a corner. Based upon the data collected through initial testing and input into the CPU, force $F_D$ is calculated as follows:

$$F_D = (G_V - 1) * W_S, \quad (100)$$

wherein:

$G_V$ is the vertical g force on the car while traveling through the corner $W_S$ is the vehicle's sprung weight.

Alternatively, if hydraulic pull-down cylinders are not available, a push-up method can be applied. The push-up method includes positioning a hydraulic jack directly under the sprung center of gravity. The car is adjusted to the ride heights expected in the middle of the corner, with the planned starting point for LR/RF cross weight, or in other terms, with the individual wheel weights at the planned starting point. As is known in the art, this can be accomplished by adjusting either the spring jack bolts or the spring height adjustment nuts on the coil spring over strut shocks, or coilover shocks, of the car 10. The individual wheel weights of each wheel 24 are then recorded, after which the jack placed under the sprung center of gravity is raised by an amount necessary to achieve movement of the suspension at each of the wheels 24. The revised wheel weights are recorded and the vertical force on each of the wheels is calculated by the equation:

$$D=((F_O-F_1)*(G_V-1)*S/F_{CGPU})+(G_V-1)F_U, \quad (102)$$

wherein:
D is the additional vertical force on the specific wheel when the vehicle chassis is subjected to a vertical g force (Gv−1);
$F_O$ is the weight of the wheel with no external forces;
$F_1$ is the weight of the wheel when the chassis is pushed up at the center of gravity with a force $F_{CGP}$;
$F_{CGPU}$ is the upward force of the hydraulic jack;
$G_V$ is the vertical g force on the car in the corner;
$F_U$ is the wheel unsprung weight; and
S is the sprung weight of the car.

When utilizing the pull-down method of either FIG. 6 or FIG. 7, horizontal forces are applied to the car when the car is being pulled down. When utilizing the push-up method, horizontal forces are applied to the car in its regular state, after the aforementioned vertical forces on each wheel have been measured and the jack lowered.

Horizontal cornering forces may be simulated by either a 1-pull or 2-pull method through use of a chainfall or come-along winch 47 attached to a wall or post 51, as best illustrated in FIG. 2. Describing the 2-pull method first, the winch 47 is first attached to the vehicle's frame 49 at the front-rear location of the sprung center of gravity 50 at a height approximating the height of the roll axis 52 of the vehicle 10. After unloading the sway bar, the vehicle 10 is pulled horizontally. If there is any upward movement of the right side of the vehicle, the point of attachment of the winch 47 to the vehicle 10 is raised, while if there is any downward movement of the vehicle the point of attachment is lowered. This is repeated until the horizontal pull results in no upward or downward movement of the right side of vehicle 10, which is the exact point that the force vector from the horizontal pull intersects the roll axis. The sway bar is then reloaded and a force $F_{P1}$, preferably at about 15-20% of the weight of the vehicle 10, is then applied to the vehicle in the direction of horizontal centripetal force. While force $F_{P1}$ is still applied, opposing force $F_{LF1}$ is applied to the inner portion of plate 28 at the LF wheel 24 by rod 64 and the pneumatic cylinder 62, as illustrated in FIG. 5. The amount of force $F_{LF1}$ is calculated by the CPU using the following equation:

$$F_{LF1}=(((1+L\%-R\%-0.5)*G_V/2)-(H_{CG}*G_H*(1-R\%)/TW))*F_{P1}/G_V, \quad (104)$$

wherein:
L % is the decimal percentage of left side weight calculated by $(W_{LF}+W_{LR})/W$ wherein $W_{LF}$ is the weight at the LF tire and $W_{LR}$ is the weight at the LR tire;
R % is the decimal percentage of right side weight calculated by $(W_{RF}+W_{RR})/W$ wherein $W_{RF}$ is the weight at the RF tire and $W_{RR}$ is the weight at the RR tire;
$G_V$ is the vertical g-force in the center of the corner; $H_{CG}$ is the height of the center of gravity of the car;
$G_H$ is the horizontal g-force in the center of the corner;
TW is the distance between the left and right wheel centers; and
$F_{P1}$ is the pull force on the right side of the car.

The CPU 48 records the pull height, pull force $F_{P1}$, and individual wheel forces before and after each pull.

With the previous horizontal pull being now unapplied, the user pulls again with force $F_{P2}$ in the direction of centripetal acceleration with the same horizontal force $F_{P1}$, but this time at the highest possible point on the roll cage 54 above the sprung center of gravity. While force $F_{P2}$ is still applied, opposing force $F_{LF2}$ is applied to the inner portion of plate 28 at the LF wheel 24 by rod 64 and the pneumatic cylinder 62, as illustrated in FIG. 5. The amount of force $F_{LF2}$ is calculated using the following equation:

$$F_{LF2}=(((1+L\%-R\%-0.5)*G_V/2)-(H_{CG}*G_H*(1-R\%)/TW))F_{P2}/G_V \quad (106)$$

The CPU 48 records the resultant pull height, and individual wheel forces before and after each pull.

Alternatively, pulls $F_{P1}$ and $F_{P2}$ of the 2-pull method can be replaced by one single horizontal pull $F_{P3}$ of the 1-pull method. Horizontal pull $F_{P3}$ occurs exactly at the height of vehicle sprung center of gravity in the same vertical plane 68 as pulls $F_{P1}$ and $F_{P2}$, at point 53. The procedure and sequence of pull $F_{P3}$ is the same as the first low horizontal pull $F_{P1}$, but the second high horizontal pull $F_{P2}$ at the high point of the roll cage is not required.

The procedures and calculations used to convert raw data into predicted tire forces are shown below. Either the push-up method or the pull-down method as previously described can be used with either of the two horizontal pull methods using pulls $F_{P1}$ and $F_{P2}$ or just pull $F_{P3}$. FIGS. 6 through 9 are flowcharts illustrating the steps taken for the four various combinations of the push-up and pull-down methods used in conjunction with the 1-pull and 2-pull methods.

With the aforementioned data collected, and depending on which of the aforementioned methods chosen, the CPU 48 calculates respective force factors, namely $FF_L$ and $FF_H$ for the low and high pulls, respectively, of the 2-pull method, or $FF_M$ for the middle single pull of the 1-pull method. $FF_L$ is calculated by multiplying the sprung weight of the car 10 by the horizontal g-force expected at the point in the corner that is being modeled, divided by the pull force $F_{P1}$ on the lower right-side portion of the frame, as embodied in the following equation.

$$FF_L=S*G/F_{P1}; \text{ wherein:} \quad (108)$$

$F_{P1}$ is the first pull force used on the right-side of the car;
S is the sprung weight of the car; and
G is the horizontal g-force expected at the point in the corner that is being modeled.
$FF_H$ is calculated using the following equation.

$$FF_H=(G*S*(H_{CGs}-H_{RC}))/(F_{P2}*(H_{FP}-H_{RC})); \text{wherein:} \quad (110)$$

$F_{P2}$ is the second pull force used on the right-side roll cage;
$H_{CGs}$ is the height of the sprung center of gravity of the car;
$H_{RC}$ is roll axis height at the sprung center of gravity; and
$H_{FP}$ is the height at which the second high pull was applied.
$FF_M$ is calculated using the following equation.

$$FF_M=S*G/F_{P3}; \text{wherein} \quad (112)$$

$F_{P3}$ is the pull force at the sprung center of gravity height.
After calculating force factors $FF_L$ and $FF_H$, or $FF_M$, depending on the chosen method of obtaining data, the CPU then calculates the Modeled Tire Force ("MTF") for each wheel 24 using the following equations.
Case 1: In accordance with the flowchart of FIG. 6, $F_{P1}$ and $F_{P2}$ horizontal pulls and hydraulic cylinder pull-down, $$MTF=F_W+((F_1-F_W)*FF_L)+((F_2-F_1)*FF_H)+F_R+F_A; \quad (114)$$

Case 2: In accordance with the flowchart of FIG. 7, $F_{P3}$ horizontal pull and hydraulic cylinder pull-down, $$MTF=F_W+((F_3-F_W)*FF_M)+F_R+F_A; \quad (116)$$

Case 3: In accordance with the flowchart of FIG. 8, $F_{P1}$ and $F_{P2}$ horizontal pulls and push-up at center of gravity, $$MTF=F_W+((F_1-F_W)*FF_L)+((F_2-F_1)*FF_H)+F_R+D+F_A; \quad (118)$$

and

Case 4: In accordance with the flowchart of FIG. 9, $F_{P3}$ horizontal pull and push-up at center of gravity, $$MTF=F_W+((F_3-F_W)*FF_M)3+F_R+D+F_A; \text{wherein:} \quad (120)$$

$F_W$ is the wheel force recorded before any pulls with the push-up method or the wheel force recorded after application of the downward pull with the pull-down method;

$F_1$ is the wheel force recorded after application of first low horizontal pull $F_{P1}$;

$F_2$ is the wheel force recorded after application of second high horizontal pull $F_{P2}$;

$F_3$ is the wheel force recorded after application of horizontal pull $F_{P3}$;

$F_{WD}$ is the additional downward force on the wheel resulting from the vertical downward force $F_D$ applied to the car by the hydraulic cylinders prior to the horizontal pulls;

D is the additional vertical force on the specific wheel when the vehicle chassis is subjected to a vertical g force $(G_v-1)$;

$F_R$ is the decrease in LR force or the increase in RR tire force due to centripetal forces acting on the rear axle assembly (unsprung weight) while the car is turning in a left hand corner (applicable to LR and RR only); and $F_A$ is the aerodynamic wheel force acquired from wind tunnel testing.

Based upon these measurements and resultant calculations, the present invention allows the user to calculate the difference between the LF and LR wheel weights as well as the difference between the RF and RR wheel weights. Under neutral steer conditions in a corner, the difference between the front and rear wheel weights will be the same for both sides of the car. The results are presented as a single number for each combination of left and right panhard bar locations. The number is calculated by the equation:

$$R=(MTF_{RF}-MTF_{RR})-(MTF_{LF}-MTF_{LR}) \quad (122)$$

Wherein:
$MTF_{RF}$=Modeled tire force for RF tire
$MTF_{RR}$=Modeled tire force for RR tire
$MTF_{LF}$=Modeled tire force for LF tire
$MTF_{LR}$=Modeled tire force for LR tire
R=Result The number R will be zero for neutral steering conditions, negative for oversteer or "loose" steering conditions and positive for understeer or "tight" steering conditions. The closer to zero that the number R is, the better the car will handle in the corner. The present invention can also calculate an MTF for multiple combinations of horizontal and vertical g-forces, which allows the user to evaluate the handling of the car during different stages of corner entry and exit, as well as evaluate the cars handling with different cornering forces that would occur on asymmetrical race tracks. The present invention is further capable of mathematically modeling changes in MTF due to changes in panhard or track bar heights by mathematically modeling the panhard bar forces that are applied to the suspension for a specific horizontal g-force, which allows the user to evaluate the effect of multiple combinations of panhard bar locations without having to change the settings on the car.

The present invention is capable of modeling changes in MTFs due to changes in LR/RF cross weight by adding equal amounts of weight to the LR and RF wheels and subtracting the same amount of weight from the LF and RR wheels. As is known in the art, the cross weight can be adjusted by changing the preload of the springs. For example, decreasing the preload on the RR spring and increasing the preload on the LR spring will decrease the cross weight. The present invention allows the user to evaluate the effect of multiple combinations of cross weight without having to make physical changes to the car. When the user determines the optimum combination of panhard bar left and right side locations and cross weight, the car can be physically adjusted to the desired settings.

Finally, it should be noted that while the present description and calculations herein are for a car with a solid rear axle going around a left hand corner, it is well within the scope of the present invention to model tire forces for road course cars (which may turn left as well as right) and for cars with independent rear suspensions. For example, to model a right hand corner, the pulls would be a mirror image of the pulls for a left hand corner.

EXAMPLE

Using the rig 20 of the present invention, a race car was tested using the push-up, two-pull method in accordance with the flowchart of FIG. 8. FIGS. 10 through 19 relate to the inputs and calculations related to this test wherein bold black boxes indicate input data obtained by measuring and weighing the race car, while regular black boxes indicate output values calculated by the computer program using the above-identified equations. Unless otherwise indicated, all dimensions are in inches, all forces are in pounds (lbs.) and spring rates/sway bar rates are in pounds per inch (lbs./in).

Figure 12:
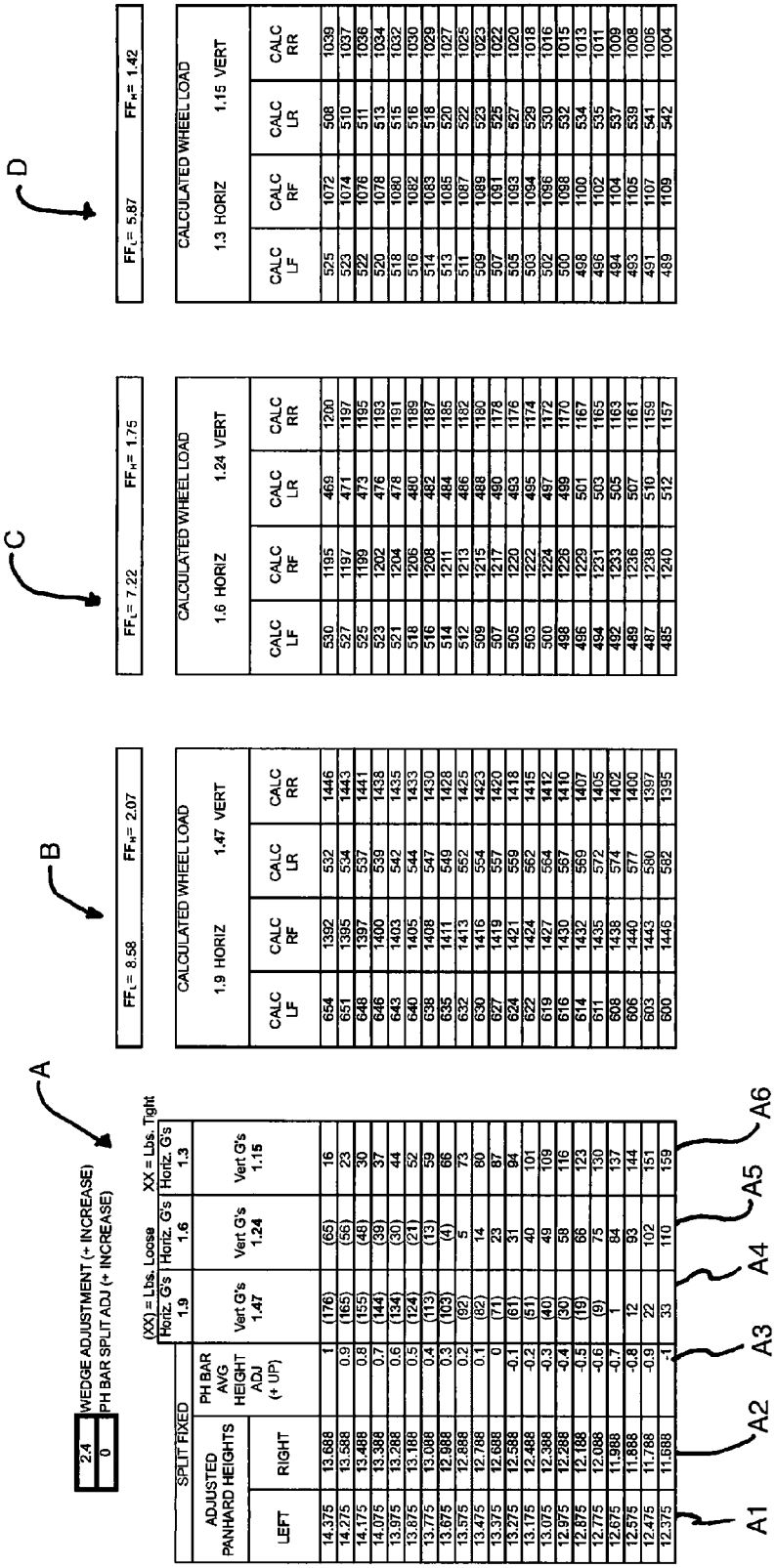
FIG. 12 contains a series of tables associated with output values of the exemplary racing vehicle with the panhard bar split (column A1-A2) held constant.
Figure 13:
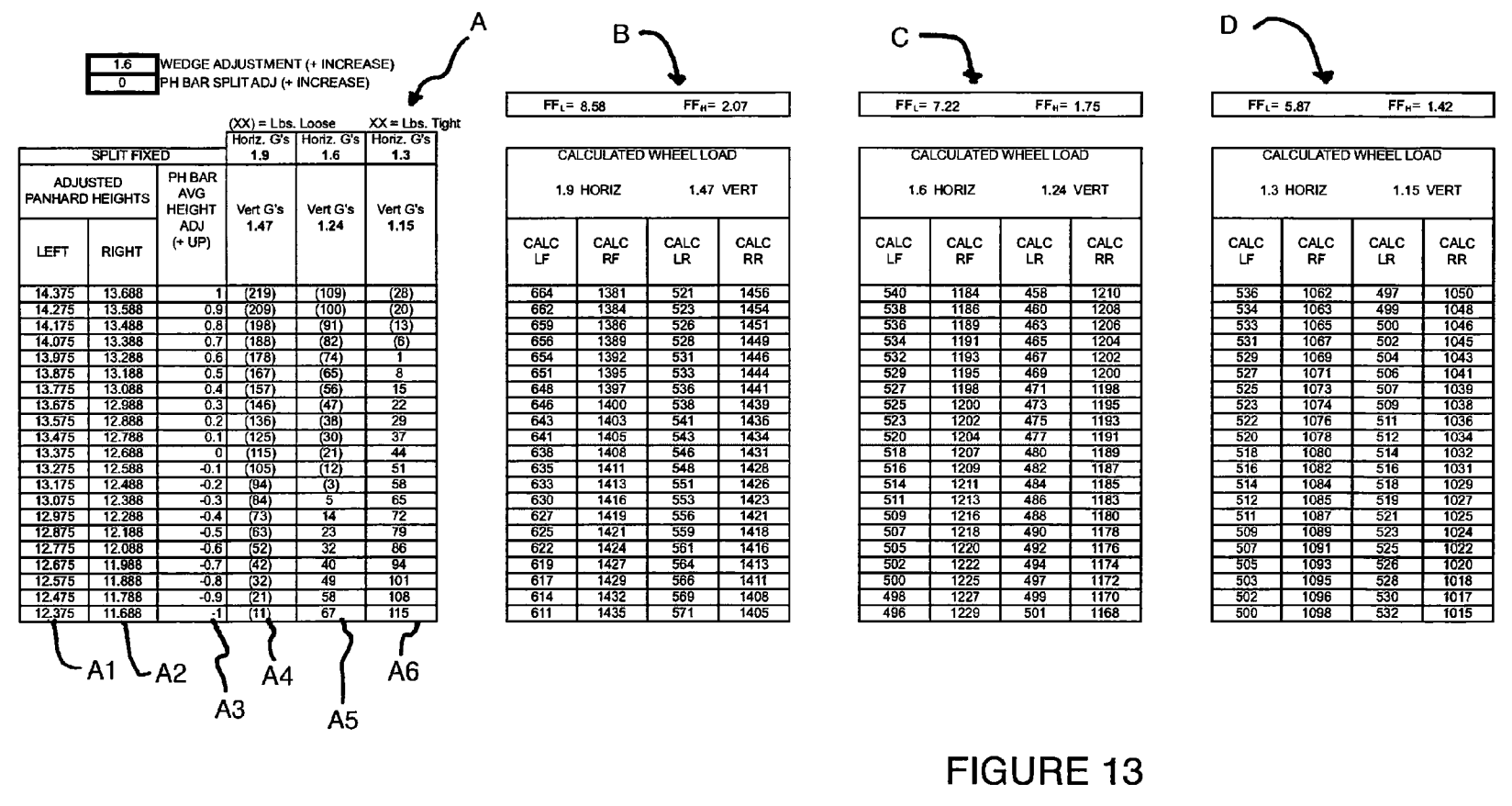
Figure 14:
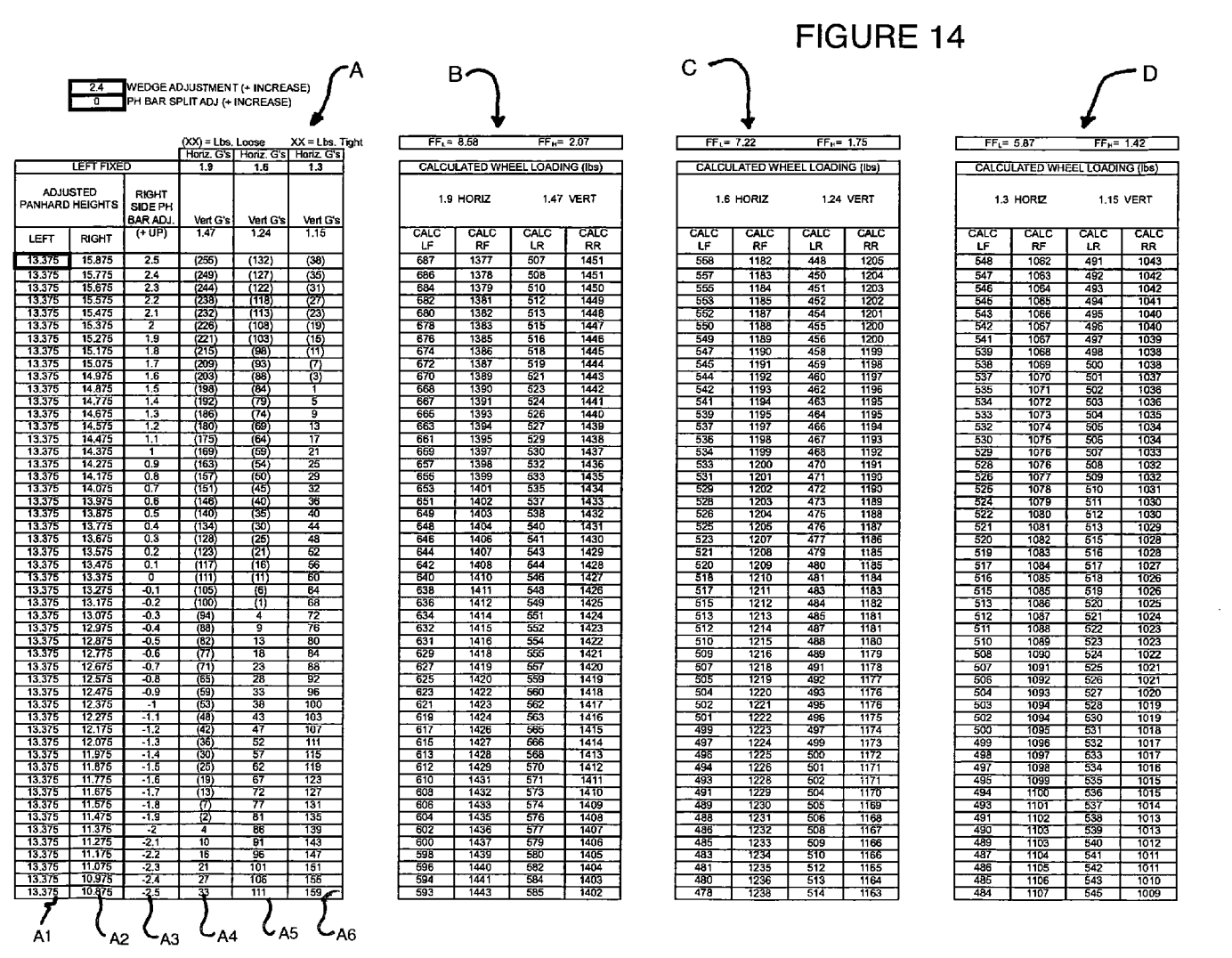
Figure 15:
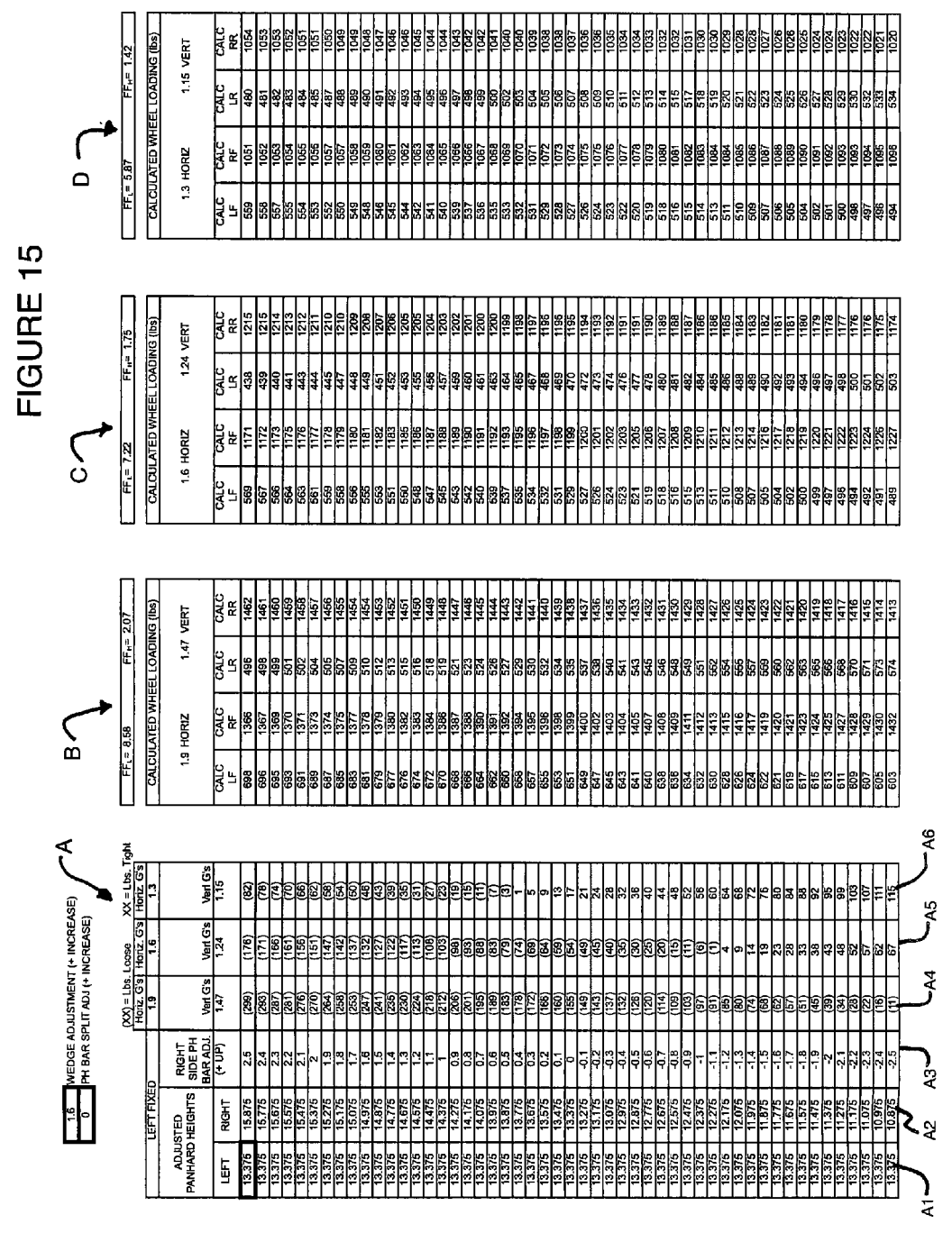
Figure 16:
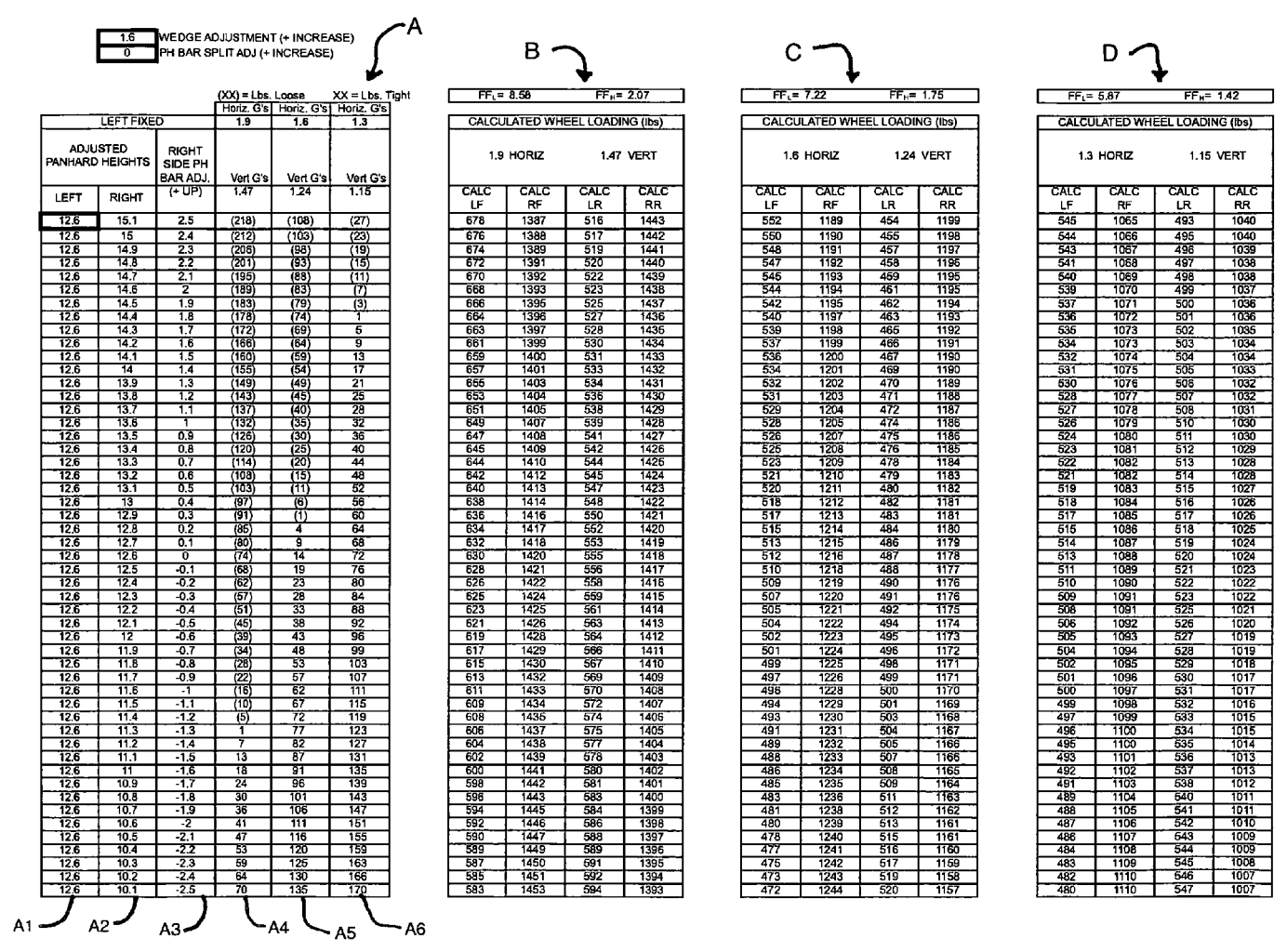
Figure 17:
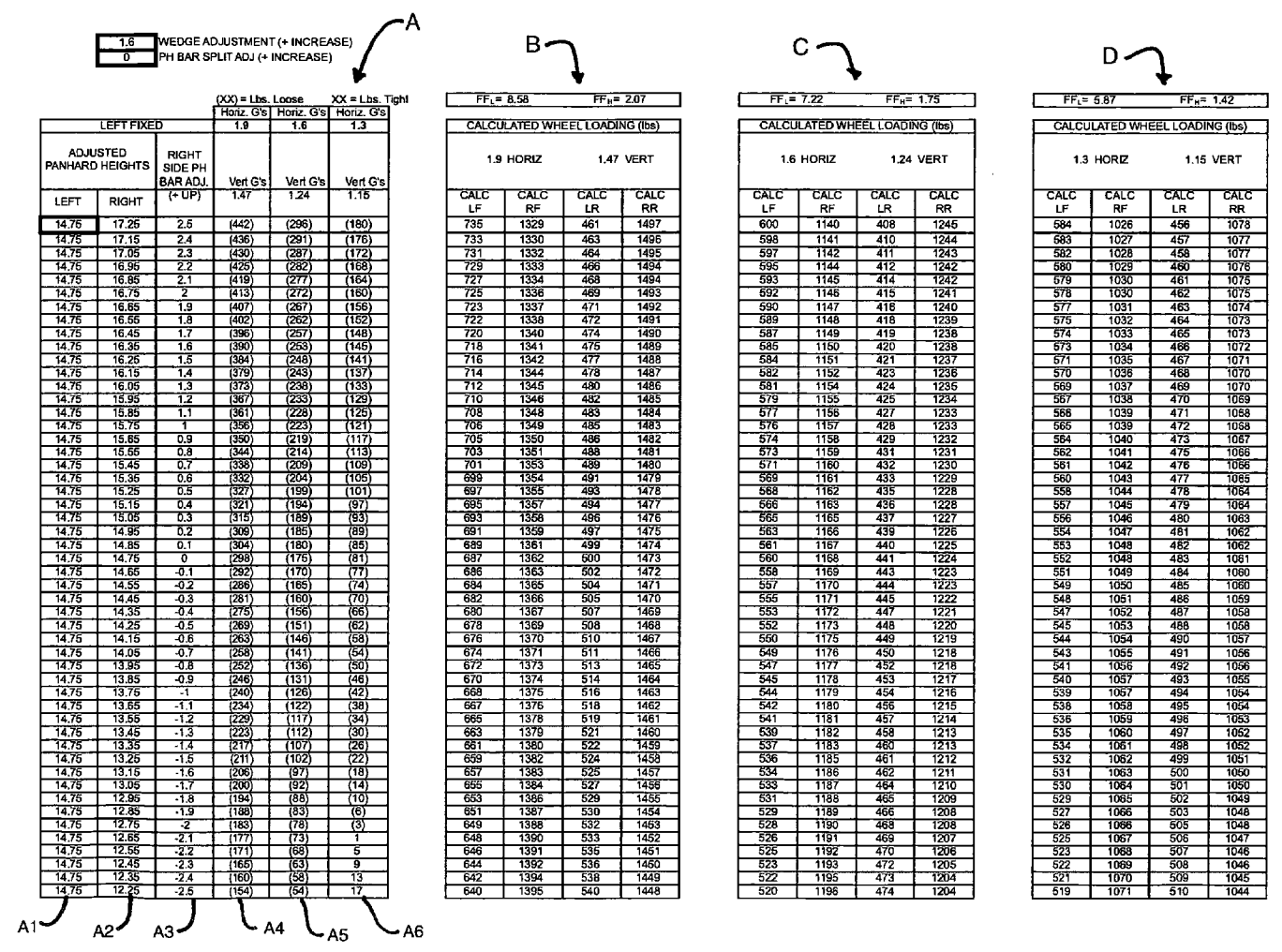
Figure 18:
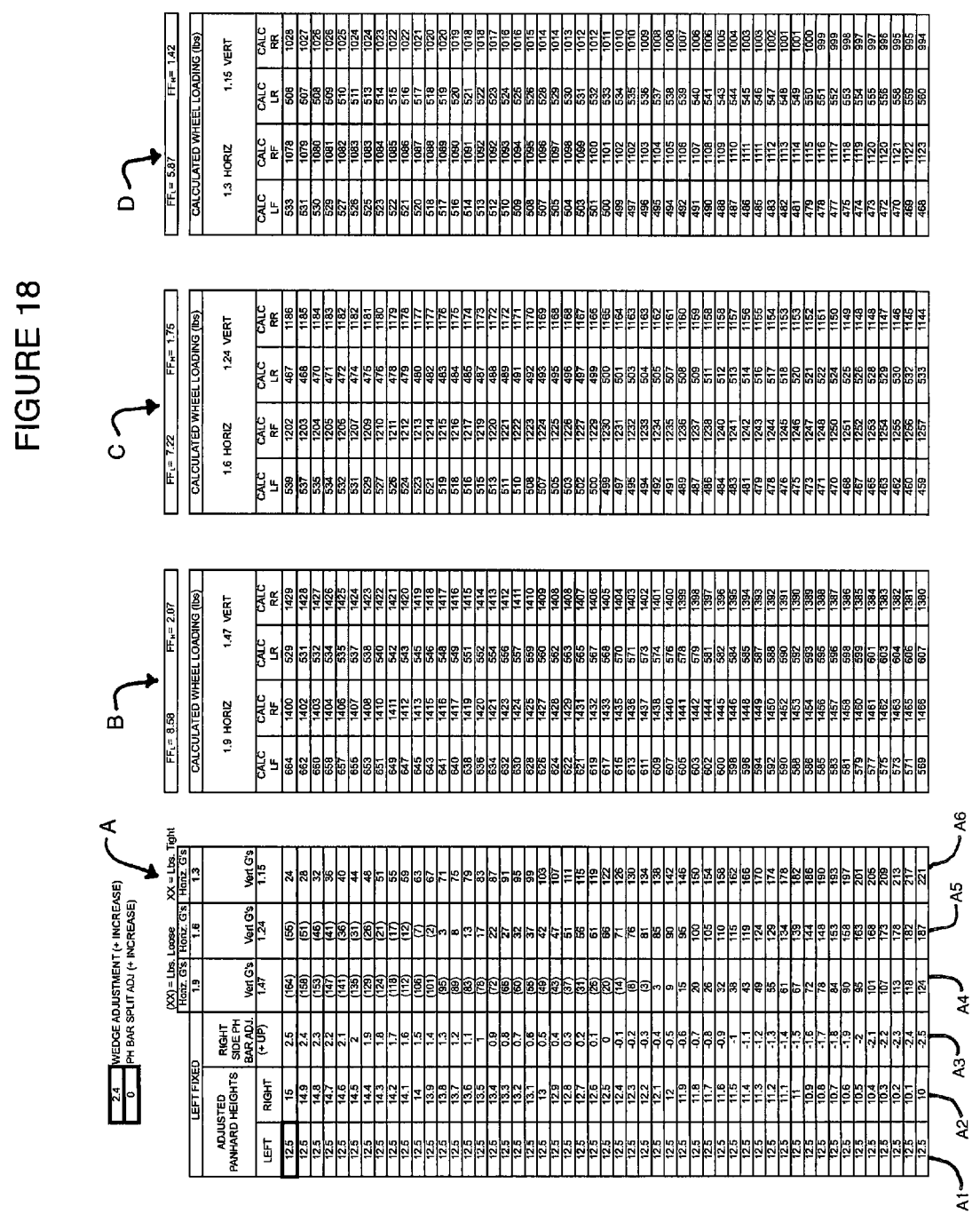
Figure 19:
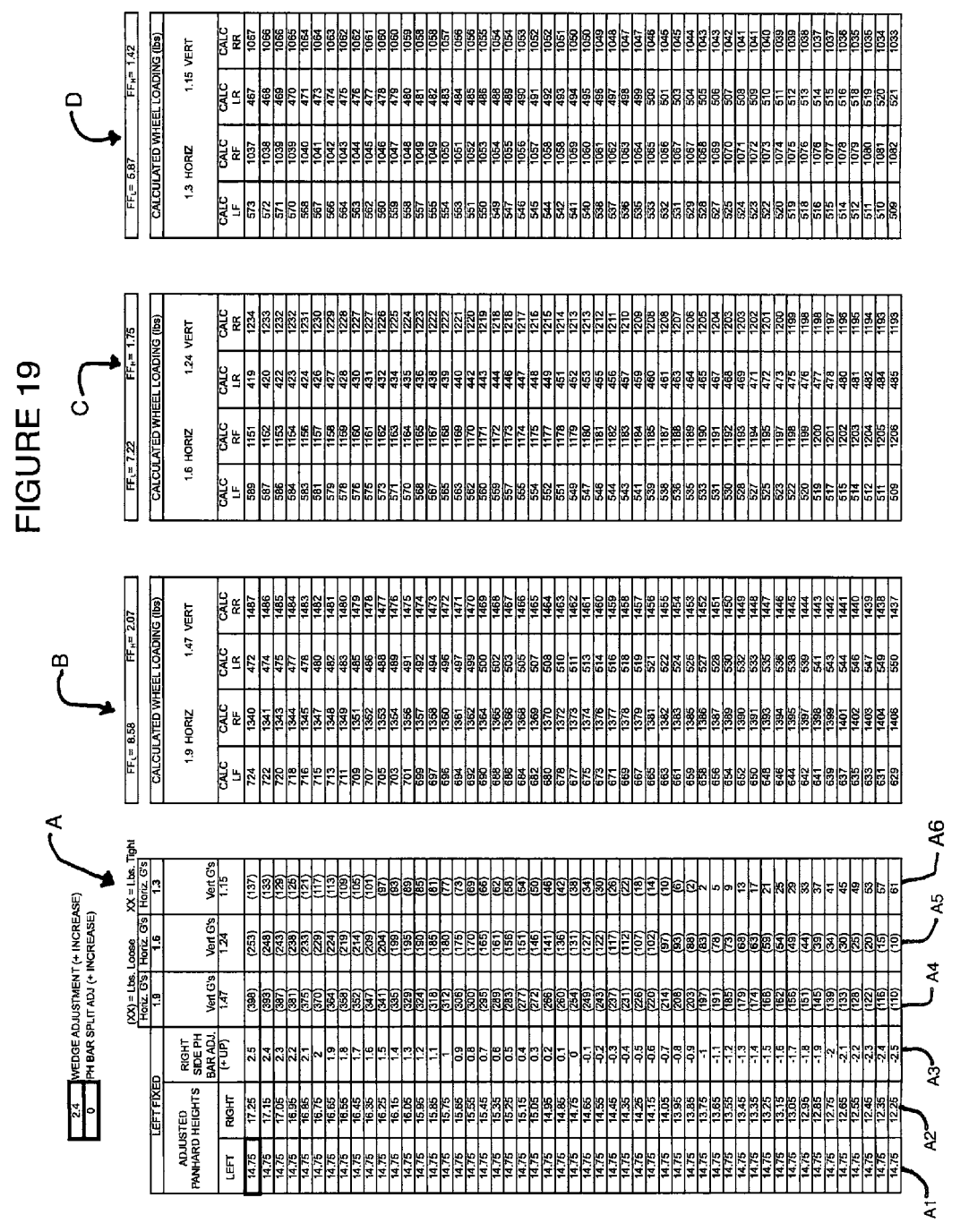

FIG. 10 contains the initial setup measurements and calculations of the race vehicle. FIG. 11 contains input values obtained implementing the push-up, two-pull method as well as resultant calculations performed by the computer program. FIGS. 12 and 13 list resultant data with the panhard bar left/right split constant (fixed), while FIGS. 14 through 19 list resultant data with the panhard bar left side constant (fixed). In each of FIGS. 12 through 19, four batches of calculations are shown. The first batch A contains six columns of information.

The first two columns list adjusted panhard bar heights for the left side and right side of the car, columns A1 and A2, respectively. The third column A3 lists panhard bar average height adjustments ranging from a positive one (1) to a negative one (−1). The three remaining columns of batch A represent resultant simulated vertical and horizontal forces R as the car enters a turn (column A6), continues into the turn (column A5) and in the center of the turn (column A4). Resultant data listed in columns A4, A5 and A6 are arrived at based upon corresponding MTF data listed in similar rows as contained in batches B, C and D using equation 122. Parentheticals represent negative numbers that indicate the setup being loose, while positive numbers indicate the setup being tight. As previously mentioned, it is typically preferable to have R as close to zero as possible. A user can thus read the results contained within columns A4, A5 and A6 and determine which is the best setup for the car at a particular point in the turn.

Referring to FIGS. 12 and 13, it can be seen that different wedge adjustments result in different calculated wheel loads (MTF), which in turn results in different calculated R for columns A4, A5 and A6.

Referring to FIGS. 14 through 19, it can be seen that by inputting various wedge adjustments and adjusted panhard heights for the left side, which remains fixed for each Figure, a user can determine the best combination for the car setup that is being tested.

In general, a car will be fastest when the forces on the front and rear tires are balanced when entering and traveling through the corner, corresponding to a zero value for R. Suspension components and adjustments on the car can be changed and another pull test performed to quantify the effect of a component or adjustment change. In this way, various combinations of suspension components and adjustments can be evaluated to achieve the optimum left-right weight transfer and therefore the most desirable handling characteristics at different segments of the corner.

Although the present invention has been described with reference to preferred embodiments, workers skilled in the art will recognize that changes may be made in form and detail without departing from the spirit and scope of the invention.

The invention claimed is:

1. A method of obtaining data for use in optimizing cornering performance in a four-wheeled racing vehicle comprising:
   positioning the vehicle on a tire force modeling rig;
   recording scale readings at each tire;
   applying a vertical force onto the vehicle to achieve spring movement at each tire;
   recording scale readings at each tire;
   applying a first horizontal force onto the vehicle;
   pulling the vehicle down at the sprung center of gravity while the first horizontal force is being applied to the vehicle; and
   recording scale readings at each tire while the first horizontal force and vertical force are applied to the vehicle.

2. The method of claim 1 further comprising pulling the vehicle down at left-front, right-front and right-rear portions of the vehicle.

3. A method of obtaining data to predict cornering wheel loading of a four-wheeled vehicle, the method comprising:
   positioning the vehicle on a tire force modeling rig;
   recording initial scale readings at each tire;
   applying a first vertical force onto the vehicle to achieve spring movement at each tire;
   recording scale readings at each tire while the first vertical force is being applied to the vehicle once spring movement has been achieved;
   applying a second vertical force onto the vehicle at the sprung center of gravity;
   recording scale readings at each tire while the second vertical force is being applied to the vehicle at the sprung center of gravity;
   applying a first horizontal force onto the vehicle at a sprung center of gravity in the direction of centripetal force the vehicle would be subjected to while proceeding through a corner; and
   recording scale readings at each tire while the first horizontal force is applied to the vehicle.

4. The method of claim 3 wherein the first horizontal force is applied at a longitudinal location of the sprung center of gravity at a height which intersects the roll axis, the method further comprising:
   releasing the first horizontal force;
   applying a second horizontal force equal to the first horizontal force at the longitudinal location of the sprung center of gravity at a height above the sprung center of gravity; and
   recording scale readings at each tire while the second horizontal force is applied to the vehicle.

5. The method of claim 4 and further comprising exerting an opposing force onto the front tire located on the side of the vehicle opposing the direction of the first and second horizontal forces, the opposing force exerted while both the first horizontal force and the second horizontal force are being applied.

6. The method of claim 4 wherein the first horizontal force and the second horizontal force are applied to the vehicle at about 15% to 20% of the weight of the vehicle.

7. The method of claim 3 wherein applying the first vertical force onto the vehicle to achieve spring movement at each tire includes raising the vehicle at the panhard bar chassis connection to achieve spring movement at each tire.

8. The method of claim 3 wherein applying the second vertical force onto the vehicle to achieve spring movement at each tire includes pulling the vehicle down at the sprung center of gravity.

9. The method of claim 3 wherein applying the second vertical force onto the vehicle to achieve spring movement at each tire includes pushing the vehicle up at the sprung center of gravity.

* * * * *